(12) United States Patent
Misaki et al.

(10) Patent No.: US 7,475,754 B2
(45) Date of Patent: Jan. 13, 2009

(54) VEHICLE BODY STRUCTURE

(75) Inventors: Toshitsugu Misaki, Okazaki (JP);
Kazumi Yasaka, Okazaki (JP);
Toshiyuki Matsumi, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/727,797

(22) Filed: Mar. 28, 2007

(65) Prior Publication Data

US 2007/0284175 A1  Dec. 13, 2007

(30) Foreign Application Priority Data

Mar. 29, 2006  (JP) ............................. 2006-090301

(51) Int. Cl.
*B60K 13/04*  (2006.01)

(52) U.S. Cl. ...................... 180/309; 180/69.1; 180/291; 180/296; 180/64 A

(58) Field of Classification Search ................ 180/309, 180/296, 291, 292, 297, 233, 252, 253, 89.2, 180/60, 58, 64, 64 A, 69.1; 296/204, 38
See application file for complete search history.

(56) References Cited

U.S. PATENT DOCUMENTS

| 4,159,043 | A | * | 6/1979 | James ......................... 180/296 |
| 4,349,078 | A | * | 9/1982 | Shimada et al. ............ 180/69.1 |
| 6,173,800 | B1 | * | 1/2001 | Steenackers et al. ....... 180/89.2 |
| 6,298,935 | B1 | * | 10/2001 | Steenackers et al. ....... 180/89.2 |
| 6,595,312 | B2 | * | 7/2003 | Yoshioka .................... 180/296 |
| 6,726,273 | B2 | * | 4/2004 | Kruschhausen et al. ..... 296/204 |

FOREIGN PATENT DOCUMENTS

JP  2001-164933 A  6/2001

* cited by examiner

*Primary Examiner*—Christopher Ellis
*Assistant Examiner*—Cynthia F. Collado
(74) *Attorney, Agent, or Firm*—Birch, Stewart, Kolasch & Birch, LLP

(57) ABSTRACT

A front cross member is installed between a pair of (right and left) front side members, and a plate-shaped sub-cross member, as a mounting member for a suspension or the like, is installed ahead of the front cross member. The front cross member and the sub-cross member are coupled by a backbone brace which is secured to the front cross member and the sub-cross member at positions in right and left portions of the front cross member and the sub-cross member by bolts or the like.

7 Claims, 5 Drawing Sheets

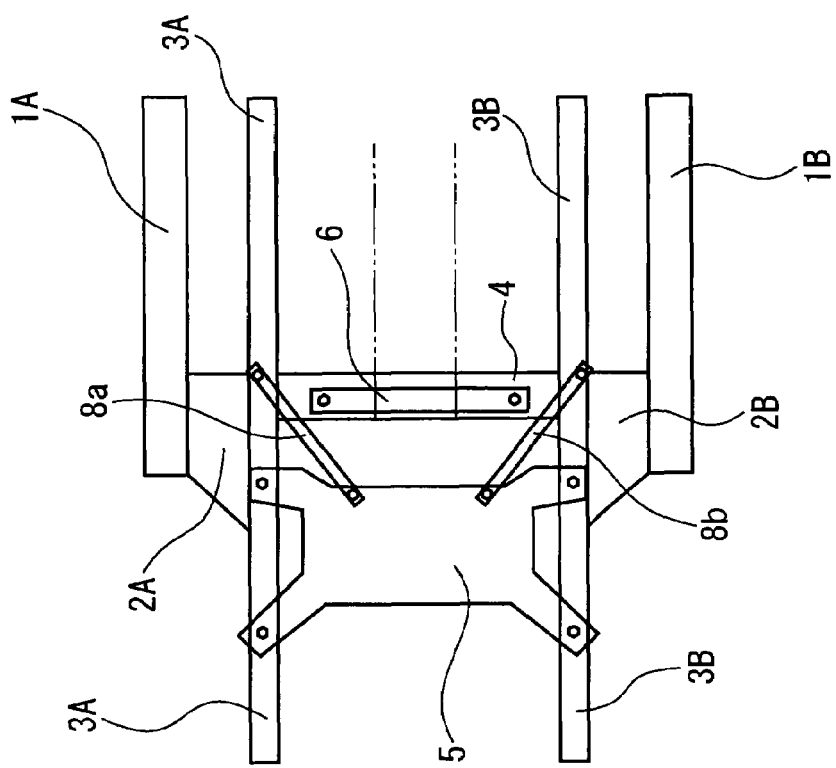
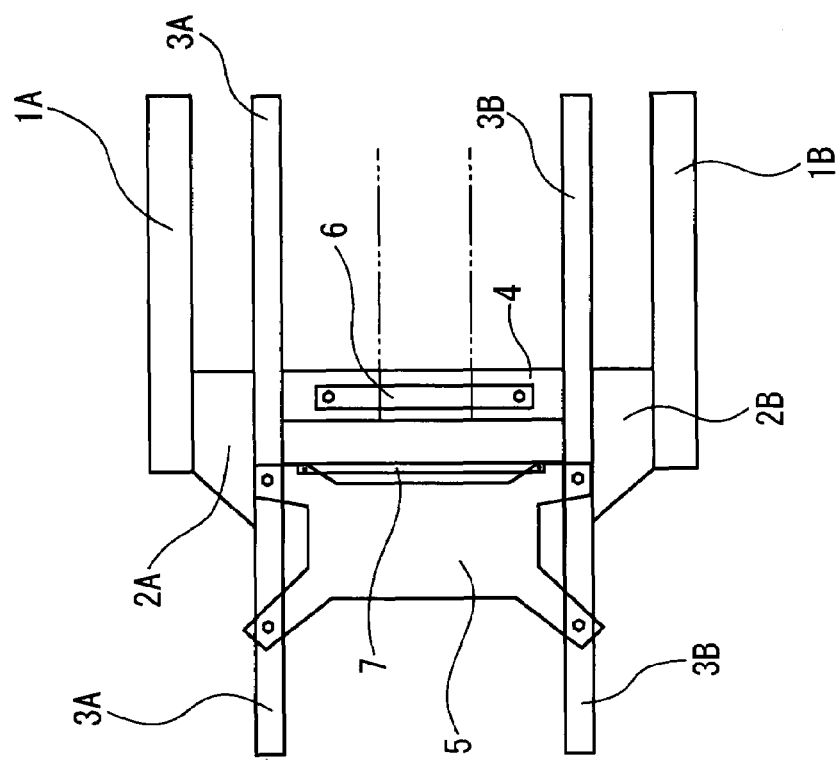

VEHICLE BODY STRUCTURE

BACKGROUND OF THE INVENTION

1. Field of the Invention

This invention relates to a vehicle body structure of a vehicle such as an automobile.

2. Description of the Related Art

In a vehicle body structure of a vehicle such as an automobile, particularly in a vehicle body front structure, it has been known that a cross member on the body side, which extends in the vehicle width direction of the vehicle, is installed between a pair of (side and left) side members extending in the longitudinal direction of the vehicle, and a cross member on the chassis side for mounting chassis parts is installed forwardly of the cross member on the body side.

As shown in FIGS. 5(a) and 5(b), for example, a front cross member (a cross member on the body side) 4 is installed between a pair of (right and lefty front side members 3A and 3B coupled to a pair of (right and left) front side sills 1A and 1B via braces 2A and 2B, and a plate-shaped sub-cross member (a cross member on the chassis side) 5, as a mounting member for a suspension or the like, is installed forwardly of the front cross member 4.

Rod-shaped reinforcing members 6 and 7 for reinforcing kickup portions (portions rising like mountains to allow passage of an exhaust pipe) of the front cross member 4 and the sub-cross member 5 are disposed, as shown in FIG. 5(a). Alternatively, the kickup portion of the front cross member 4 is reinforced with the rod-shaped reinforcing member 6, while the sub-cross member 5 is reinforced with a pair of (right and left) rod-shaped reinforcing members 8a and 8b which are installed, as diagonal bracings, at the pair of (right and left) front side members 3A and 3B, as shown in FIG. 5(b).

In these vehicle body front structures, the exhaust pipe (not shown) is set in place by a dedicated holding mechanism such as a bracket (see Japanese Unexamined Patent Publication No. 2001-164933 as a pertinent publication).

However, with the conventional vehicle body front structure, for example, that shown in FIG. 5(a), the reinforcing members 6 and 7 for the front cross member 4 and the sub-cross member 5 are not coupled together. Thus, as shown in FIG. 6(a), there are no bridges linking a front portion and a rear portion in a region indicated by the letter X in the drawing. This has posed the problem that in response to inputs transmitted from torsion or the like of the suspension or the body (see dotted arrows in the drawing), a phase difference occurs between the body side and the chassis side, resulting in a tendency toward a decline in rigidity. In order to ensure necessary rigidity (in order not to impair handleability, for example), therefore, it is necessary to set the wall thicknesses of the reinforcing members 6 and 7 at high values.

With the structure shown in FIG. 5(b), on the other hand, a backbone tunnel portion to be described later is not reinforced. Thus, as shown in FIG. 6(b), there has been the problem that in response to inputs transmitted from torsion or the like of the suspension or the body (see dotted arrows in the drawing), a region with low rigidity is present in a backbone tunnel portion indicated by the letter Y in the drawing, which serves as a support for the exhaust pipe or the like. In order to ensure necessary rigidity (in order not to impair handleability, for example), therefore, it is necessary to set the wall thicknesses of the reinforcing members 6, 8a and 8b at high values.

The present invention has been accomplished in light of the above-described problems with the earlier technologies. It is an object of the invention to provide a vehicle body structure equipped with a reinforcing member which can transmit forces to the body side and the chassis side in a well-balanced manner in response to inputs transmitted from torsion or the like of the suspension or the body, thereby ensuring efficient reinforcement.

SUMMARY OF THE INVENTION

An aspect of the present invention is a vehicle body structure comprising right and left side members taken as a pair, and extending in a longitudinal direction of a vehicle; a cross member on a body side installed between the side members, and extending in a vehicle width direction of the vehicle; and a cross member on a chassis side installed ahead of or behind the cross member on the body side for mounting chassis parts, wherein the cross member on the body side and the cross member on the chassis side are coupled by a plate-shaped reinforcing member.

The vehicle body structure may further comprise an exhaust pipe extending out toward a rear of the vehicle from an engine main unit provided between the right and left side members as the pair, a kickup portion rising in a mountain-shaped form to allow passage of the exhaust pipe may be formed in the cross member on the body side, and the reinforcing member may be secured to both sides of the kickup portion.

The reinforcing member may be adapted to fix the exhaust pipe.

The reinforcing member may be formed in a trapezoidal shape, and may have securing points at respective corners thereof.

The reinforcing member may be H-shaped, and may have both sides fanning out.

The vehicle body structure according to the present invention, described above, can transmit forces to the body side and the chassis side in a well-balanced manner in response to inputs transmitted from torsion or the like of the suspension or the body, thereby effectively suppressing the deformation of the system comprising the body and the suspension. Thus, the number of the components of the vehicle body can be decreased, and the plate thicknesses of these components can be set at low values. Consequently, the vehicle can be rendered lightweight, and its cost can be reduced.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5(a) and FIG. 5(b) are schematic bottom views of conventional vehicle body front structures.

DETAILED DESCRIPTION OF THE INVENTION

A vehicle body structure according to the present invention will be described in detail by an embodiment with reference to the accompanying drawings.

EMBODIMENT

Figure 1:
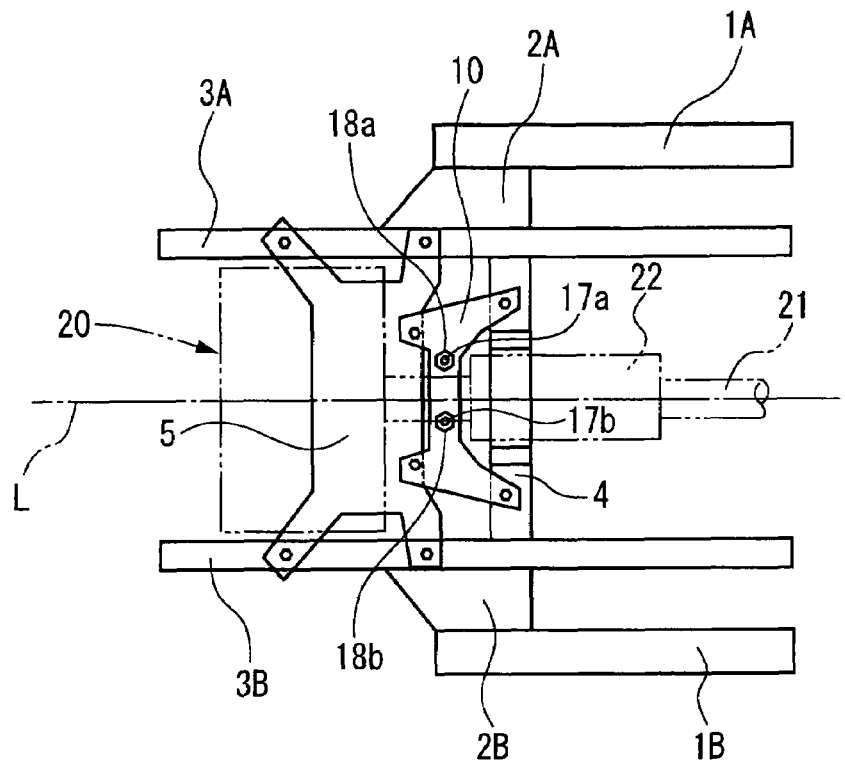
FIG. 1 is a schematic bottom view of a vehicle body front structure showing an embodiment of the present invention.
Figure 2:
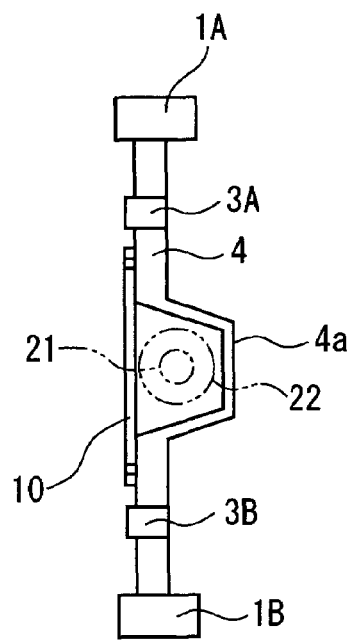
FIG. 2 is a rear view of the vehicle body front structure.
Figure 3:
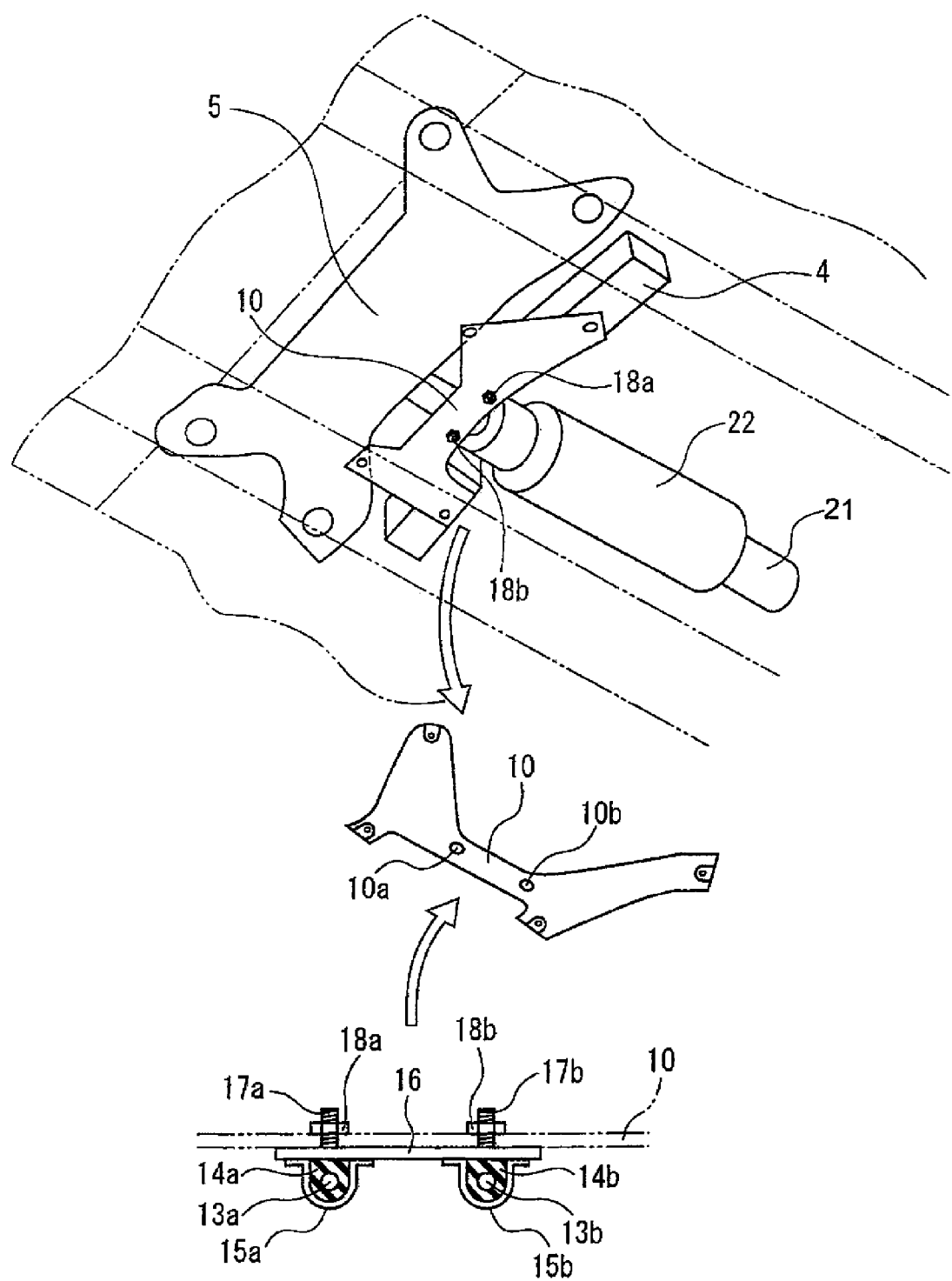
FIG. 3 is a perspective view of the vehicle body front structure.
Figure 4:
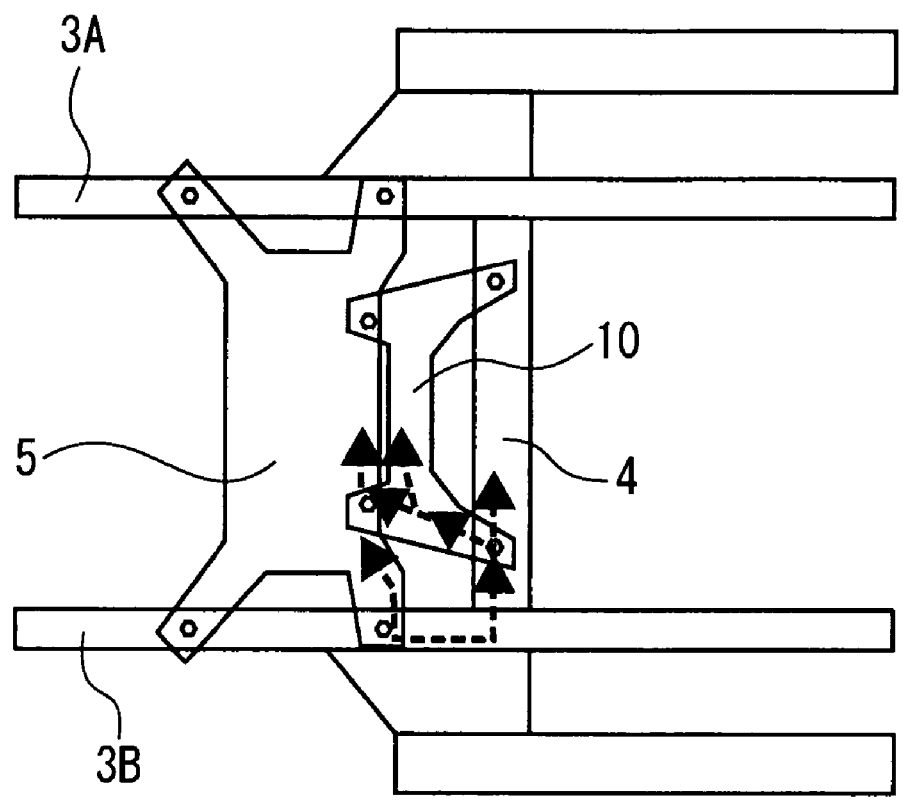
FIG. 4 is an explanation drawing showing a force transmission system of the vehicle body front structure.
Figure 6B:
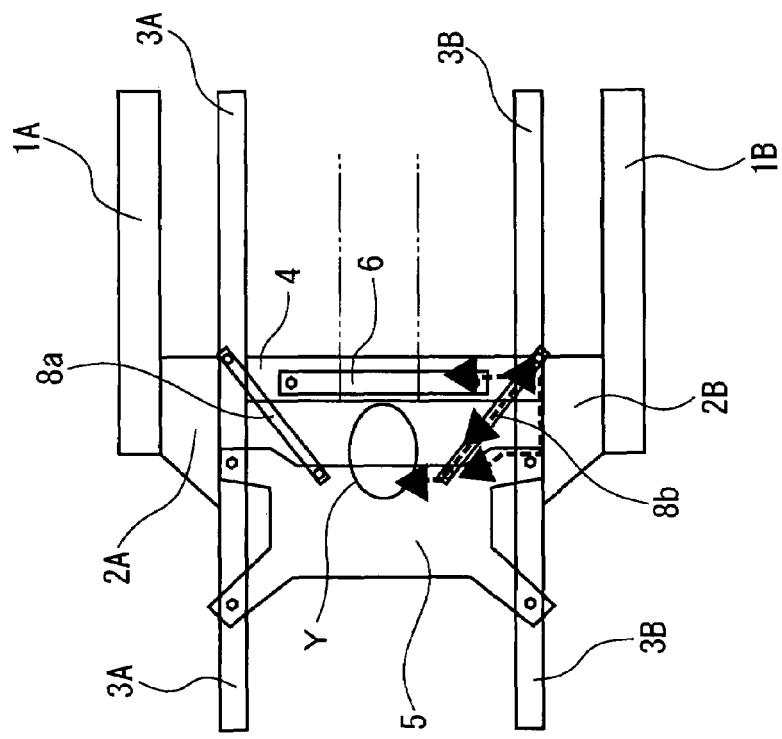
FIG. 6(a) and FIG. 6(b) are explanation drawings showing force transmission systems of the conventional, vehicle body front structures.
Figure 6A:
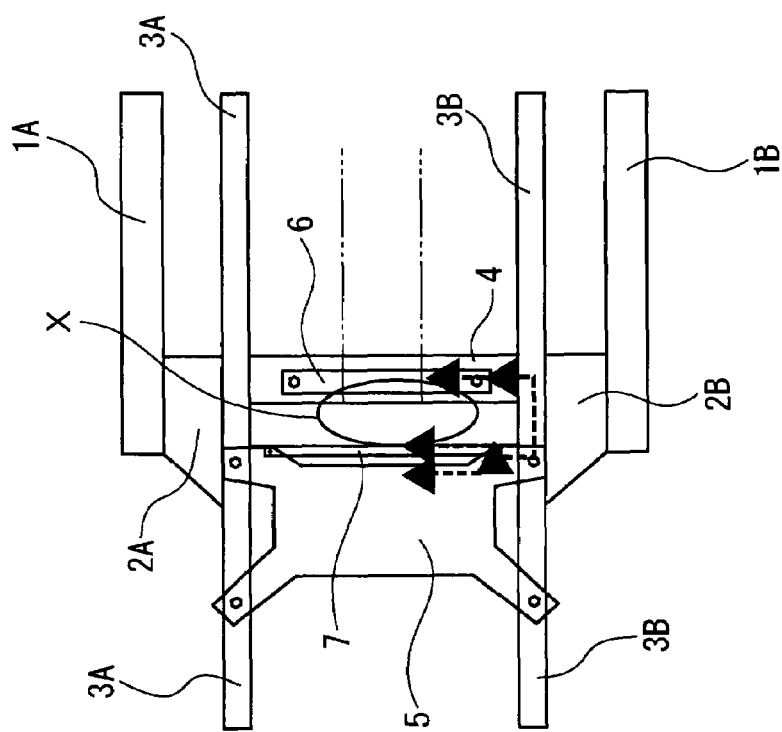

FIG. 1 is a schematic bottom view of a vehicle body front structure showing an embodiment of the present invention. FIG. 2 is a rear view of the vehicle body front structure. FIG. 3 is a perspective view of the vehicle body front structure. FIG. 4 is an explanation drawing showing a force transmission system of the vehicle body front structure.

As shown in FIGS. 1 to 3, a front cross member (a cross member on the body side) 4 is installed between a pair of (right and left) front side members 3A and 3B coupled to a pair of (right and left) front side sills 1A and 1B via braces 2A and 2B, and a plate-shaped sub-cross member (a cross member on the chassis side) 5, as a mounting member for a suspension or the like (chassis parts), is installed ahead of the front cross member 4.

Reference numeral 20 in FIG. 1 denotes an engine main unit installed between the pair of (right and left) front side members 3A and 3B by a suitable means. An exhaust pipe 21 extends out toward the rear of the vehicle from the engine main unit 20. A catalyst device 22 such as DPF is interposed in the exhaust pipe 21.

In the present embodiment, the front cross member 4 and the sub-cross member 5 are coupled together by a backbone, brace (a plate-shaped reinforcing member) 10 which is secured, to these members 4 and 5 at positions bilaterally symmetrical about the center line L of the vehicle by bolts or the like.

The backbone brace 10, in the illustrated example, is H-shaped, has both (right and left) sides fanning out toward the rear of the vehicle, and has opposite end portions secured to the two members 4 and 5. However, the backbone brace 10 may be simply formed in a trapezoidal shape, and may have corners secured to the two members 4 and 5.

In the backbone brace 10, as shown in FIG. 3, a pair of (right and left) mounting holes 10a and 10b are formed, and a bracket 16 provided with hangers 15a, 15b for fixing the exhaust pipe 21 is mounted to the backbone brace 10 by bolts 17a, 17b and nuts 18a, 18b via the mounting holes 10a, 10b. That is, rod-shaped brackets 13a and 13b, which extend out from right and left peripheral surfaces of the exhaust pipe 21 toward the front of the vehicle, are passed through and supported by the hangers 15a and 15b via rubber bushes 14a and 14b.

In the illustrated example, the exhaust pipe 21 is fixed to the backbone brace 10 via the bracket 10 having the bolts 17a and 17b. However, the hangers 15a and 15b may be directly fixed to the backbone brace 10 by bolts and nuts without use of the bracket 16.

In the present embodiment, the front cross member 4 and the sub-cross member 5 are coupled by the backbone brace 10, as mentioned above. Thus, as shown in FIG. 4, forces can be transmitted to the body side and the chassis side in a well-balanced manner in response to inputs transmitted from torsion or the like of the suspension or the body (see clotted arrows in the drawing).

Moreover, the backbone brace 10 is secured to both sides of a kickup portion 4a rising in a mountain-shaped form, the kickup portion 4a being formed in the front cross member 4 to allow the passage of the exhaust pipe. Thus, the backbone brace 10 concurrently functions to reinforce the kickup portion 4a itself.

Furthermore, the backbone brace 10 is also secured to the sub-cross member 5 at the positions bilaterally symmetrical with respect to the center line L of the vehicle. Thus, the backbone brace 10 concurrently functions to reinforce the sub-cross member 5 itself.

In the present embodiment, moreover, the backbone brace 10 is H-shaped, and has both (right and left) sides fanning out toward the rear of the vehicle. Thus, the backbone brace 10 can effectively cancel out a deformation mode due to a parallelogram, and can ensure a working space in an operation for fixing the exhaust pipe 21.

Besides, the mounting holes 10a and 10b are formed in the backbone brace 10, enabling the exhaust pipe 21 to be fixed. Thus, a dedicated holding mechanism such as a bracket, as required in the conventional technologies, is unnecessary, and the number of the components can be decreased further.

The vehicle body structure according to the present invention can be applied not only to a vehicle body front structure of a vehicle, such as an automobile, but also to a vehicle body rear structure of the vehicle.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle body structure, comprising:
    a pair of right and left side members extending in a longitudinal direction of a vehicle;
    a cross member on a body side installed between the pair of side members, and extending in a vehicle width direction of the vehicle;
    a cross member on a chassis side installed ahead of or behind the cross member on the body side for mounting chassis parts; and
    a plate-shaped reinforcing member coupled to the cross member on the body side and the cross member on the chassis side, a width of the plate-shape reinforcing member at an end closer to the cross member on a body side being larger than a width at an end closer to the cross member on a chassis side.

2. The vehicle body structure according to claim 1, further comprising:
    an exhaust pipe extending towards a rear of the vehicle from an engine main unit provided between the pair of right and left side members,
    wherein a kickup portion rising in a mountain-shaped form to allow passage of the exhaust pipe is formed in the cross member on the body side, and
    the reinforcing member is secured to both sides of the kickup portion.

3. The vehicle body structure according to claim 2, wherein the exhaust pipe is supported by the reinforcing member.

4. The vehicle body structure according to claim 1, wherein the reinforcing member is formed in a trapezoidal shape, and has securing points at respective corners thereof.

5. The vehicle body structure according to claim 1, wherein the reinforcing member is H-shaped, and has a fanning out portion at both sides thereof.

6. The vehicle body stmcture according to claim 2, wherein the reinforcing member supports the exhaust pipe via a bracket attached to the reinforcing member.

7. A vehicle body structure, comprising:
- a pair of right and left side members extending in a longitudinal direction of a vehicle;
- a cross member on a body side installed between the pair of side members, and extending in a vehicle width direction of the vehicle, the cross member on a body side having a kickup portion rising in a mountain-shaped form to allow passage of the exhaust pipe inside the kickup portion;
- a cross member on a chassis side installed ahead of the cross member on the body side for mounting chassis parts;
- a plate-shaped reinforcing member coupled to the cross member on the body side and the cross member on the chassis side, the reinforcing member being secured to both sides of the kickup portion from below the cross member on a body side and forms a closed cross-section that accommodates the exhaust pipe.

* * * * *